J. U. COOPER.
WASHER.
APPLICATION FILED FEB. 11, 1914.
1,179,283.
Patented Apr. 11, 1916.
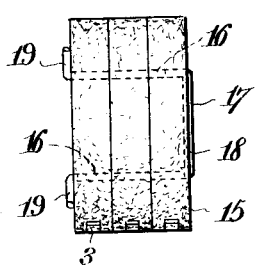
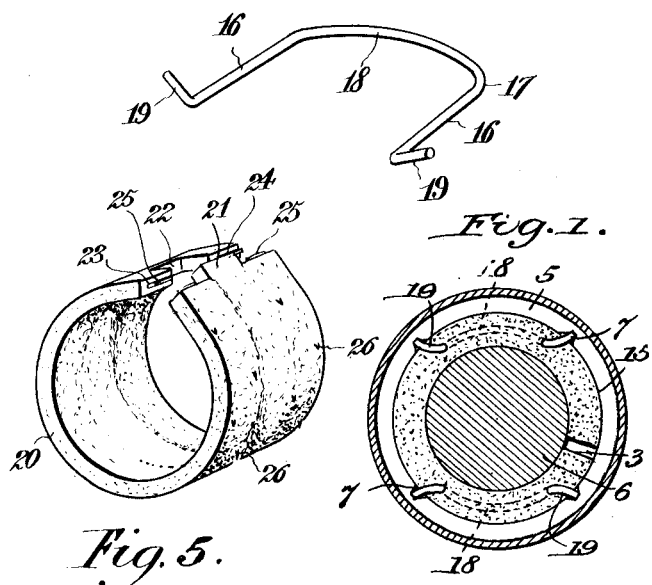
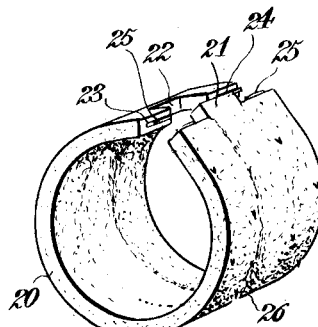
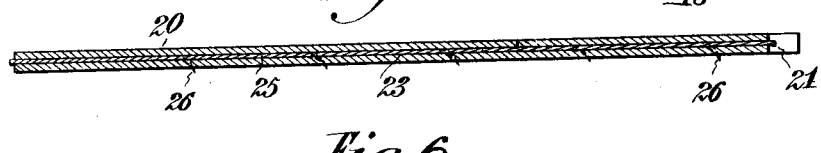
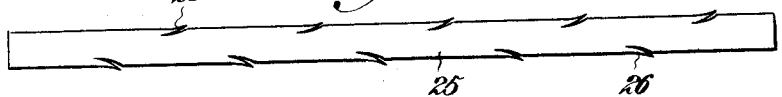
James U. Cooper.
By Victor J. Evans,
Attorney.
Witnesses—
C. Feinle, Jr.,

UNITED STATES PATENT OFFICE.

JAMES U. COOPER, OF NEW YORK, N. Y.

WASHER.

1,179,283.

Specification of Letters Patent.

Patented Apr. 11, 1916.

Application filed February 11, 1914. Serial No. 818,114.

*To all whom it may concern:*

Be it known that I, JAMES U. COOPER, a citizen of the United States, residing at New York, in the county of New York and State of New York, have invented new and useful Improvements in Washers, of which the following is a specification.

The present invention relates to a washer designed for use upon automobiles, and adapted to prevent the lubricant or "dope" flowing from the box or housing of the differential gears along the shaft to the brake mechanism, and interfering with or impairing the working of the said brake mechanism.

The invention further resides in the construction of a compressible washer that may be easily and quickly applied and which will be self-sustaining when in applied position, that is, no nuts or boxes will be required for holding the washer against movement to prevent the same entering the housing of the differential gears.

A further object of the invention is to provide a washer of this class which may be compressed or bulged to adapt itself to the varying thicknesses or diameters of the parts to which it is applied.

With the above and other objects in view, the invention resides in the construction, combination and arrangement of parts set forth in the following specification and falling within the scope of the appended claim.

In the drawings there has been illustrated a simple and preferred embodiment of the improvement reduced to practice, but the important instrumentalities thereof may be varied, and so I am entitled to all such changes as fall within the scope of my claim.

In the drawings: Figure 1 is a sectional view of a slightly modified form of washer. Fig. 2 is a side elevation of the washer illustrated in Fig. 4. Fig. 3 is a perspective view of the spring reinforcing members employed in connection with the type of washer illustrated in Figs. 4 and 5 of the drawing. Fig. 4 is a perspective view of a still further modified form of the washer. Fig. 5 is a sectional view taken in line with one of the springs employed in connection with the form of washer illustrated in Fig. 4. Fig. 6 is a plan view of the spring.

As is well known the gears within the housing must be constantly lubricated, and to accomplish this the top of the housing is removed, at intervals, the gears washed by the application of gasolene or similar cleansing liquid, and the box packed with a lubricant grease, commonly termed "dope". The dope is of a gelatinous condition or state and under the continuous grinding of the intermeshing teeth of the gears within the box or housing, the same is reduced to almost a liquid state, and is propelled or forced toward the sleeves or collars upon the opposite sides of the gear box, as there is no other means of exit. As a consequence the lubricant travels upon the line of the axles and will be received within the box or housing of the brake mechanism, where the same is not desirable, and will so interfere with the working of the said mechanism as to render the same either defective or unreliable. The collars or sleeves of the differential gear housings, at their juncture with the said housings, are provided generally with anti-frictional bearings for the axles, and gaskets upon the opposite sides of the said bearings. These gaskets, however, have been found inefficient in preventing the flow of the lubricant to the brake mechanism, and furthermore the application of the said gaskets, at these points of the structure, requires the removal of the axles as well as a number, if not all, of the gears from the housing, and again the movement of parts and the constant revolving of the axles produce a great amount of wear upon the gaskets and not infrequently cause the same to be projected within the housing, thus interfering with the differentials and putting the machine out of commission. The wear upon the gaskets renders the same ineffective for preventing the flow of the lubricant to the brake mechanism, and their employment has thus been found to be extremely costly, with respect to repairs and application, and consequently not desirable.

In Fig. 1 of the drawings I have illustrated the application of one form of my improvement showing the same arranged to surround an axle 6 disposed within the sleeve or collar 5 of the boxing of the differential gear, the ends of said sleeve only being illustrated as the parts of the differential gear do not form a part of this application, and therefore a detailed description of the same or an extensive illustration is not deemed necessary. The collar 5 is surrounded by the usual tubular member which provides a protector having a portion of the axle extending beyond the collar 5.

In the device illustrated in Figs. 1 to 3 the washer 1 may be formed of a plurality of compressible members which are normally retained in a flat position, but which are adapted to be bent or otherwise rounded to snugly engage with the outer periphery of the axle and the inner periphery of the bore of the collar 5. To expand the compressible member 1 I pass transversely through the same the arms 16 of a substantially U-shaped spring compression member 17. The connecting member 18 for the arm 16 may be slightly arched and the ends of said arms are provided with offset fingers 19 which may be received in suitable notches 7 in the collar 5 of the housing or may lie snugly against the outer ends of said collar. The connecting member 18 for the arms is necessarily bent at a curvature when the flat strip is brought to its rounded position and as a consequence the said member 18 exerts a tension between the arms 16 causing the same to spread in an outward direction and consequently bring the fingers 19 into frictional engagement with the walls of the notches or the wall of the collar to hold the washer against movement when positioned, and at the same time bulge the washer across the same to frictionally contact between the axle and the collar.

In Figs. 5 and 6 I have illustrated a still further form of the device. As stated the washers are in the nature of sleeves, but the said washers before being shaped are flat, and the washer 20, at present being referred to, on the opposite sides of its tongue 21 and adjacent the longitudinal wall provided by the groove 22 has substantially rectangular passages 23 and 24. The numerals 25—25 designate flat spring members one of which is adapted for insertion within each of the passages 23—24. The springs are adapted to exert an outward tension, that is to normally spread and hold the washer 20 in a straight or flat condition, so that when the said washer is shaped in active position the springs will have a tendency to force the meeting ends of the washer outwardly and away from each other. Each of the flat springs 25 is provided upon its longitudinal edge with outwardly turned angularly arranged teeth 26, the same, when the washer is bent, projecting a slight distance beyond the outer face of the washer, and in arranging the washer between the axle and inner wall of the sleeve or collar 5, one end of the washer is first inserted and allowed to expand or give under the tension or influence of the spring 25 which is in that part of the washer at that time arranged between the axle and collar. The teeth of the expanded spring engaging with the inner wall of the collar 5 will retard the same against movement, and the portion of the washer between the said spring and the second or adjacent spring is then compressed or bulged around the axle, until the second spring is inserted within the collar. The said second spring expanding, brings its teeth into engagement with the wall of the collar, and so the washer is automatically sustained against movement, while the felt body provides a dam for preventing the exit of the lubricant from the differential box.

From the above description, taken in connection with the accompanying drawings, the simplicity of the device, as well as the advantages of the same will, it is thought, be perfectly apparent to those skilled in the art to which such invention appertains without further detailed description.

Having thus described the invention, what I claim is:

A washer for preventing the passage of a lubricant through the collar or sleeve of a differential gear boxing along an axle to the brake mechanism, comprising a strip of absorbent material which is arranged around the axle and inserted within the collar or sleeve, metal members of spring material associated with the washer to expand the same, the said spring members coöperating with the sleeve or collar for preventing the movement of the washer.

In testimony whereof I affix my signature in presence of witnesses.

JAMES U. COOPER.

Witnesses:
 GEORGE H. PLACE,
 MINNIE D. NEUMAN,
 LOUIS ROSENTHAL.